Patented May 18, 1954

2,678,939

UNITED STATES PATENT OFFICE 2,678,939

METHOD OF PREPARING ALKALI METAL XANTHATES

John C. McCool, Akron, Ohio, assignor to The B. F. Goodrich Company, New York, N. Y., a corporation of New York No Drawing. Application July 26, 1951,
Serial No. 238,765

6 Claims. (Cl. 260—455)

This invention relates to the preparation of alkali metal xanthates and more specifically pertains to an improved method for preparing alkali metal xanthates whereby the xanthate can be produced in a substantially pure form and in high yields by commercially feasible operations.

The basic reaction involved in the preparation of alkali metal xanthates is the reaction between carbon disulphide and an alkali metal alcoholate. This reaction is well known to the art, the alcoholate being first prepared by the well-known reaction of an alcohol with an alkali metal or alkali metal hydroxide. However, considerable difficulty has been encountered in adapting these reactions to successful commercial operation. It has been found that the presence of water during the reaction of the alcoholate with carbon disulfide ordinarily promotes undesirable side reactions leading to formation of sulfides and thiocarbonates with resultant deleterious effects on the yield and purity of the desired xanthate. Elimination of water during xanthate formation is possible by using anhydrous alcohol and alkali metal in formation of the alcoholate, or, if the alcoholate is prepared from alcohol and alkali metal hydroxide, by addition of dehydrating agents to react with the water formed, but neither of these expedients has proved feasible on a commercial scale. It is also possible to employ anhydrous alkali metal hydroxide in place of the ordinary aqueous caustic in preparation of the alcoholate, thereby to reduce the amount of water present, but this introduces in plant operation the serious problem of storing such a deliquescent material, as well as corrosion difficulties and health hazards.

I have now discovered an improved process for preparing alkali metal xanthates which employs no difficultly handled alkali metal or anhydrous alkali metal hydroxide, and which avoids the use of dehydrating agents or special dehydrative steps. It involves the presence of up to two moles of water for each mole of xanthate formed, but, surprisingly, it produces xanthates of a purity of at least 95 to 99% with product yields well above 85%.

My process involves reacting in an organic liquid medium, an alkali metal hydroxide with an alcohol in the presence of not more than 1 and preferably from 0.5 to 1.0 mole of water for each mole of alkali hydroxide, at a temperature of 70 to 100° C., to form a gelatinous dispersion or slurry of the alcoholate in the organic liquid medium, then cooling the dispersion below the boiling point of carbon disulfide and reacting the dispersed alcoholate with carbon disulfide to give the xanthate, which is easily recovered from the reaction mixture in high yields and in a high state of purity.

The organic liquid medium in which the alcoholate is formed may be either excess alcohol or an inert organic solvent for the alcohol. The dispersion is readily formed if the alkali metal hydroxide is reacted with an amount of alcohol in excess of equimolecular portions or by reacting the hydroxide with substantially equimolecular proportions of anhydrous alcohol dissolved in a suitable inert solvent. When the alcohol is used in excess to form the dispersion of the alcoholate, it is preferred that not more than 10 moles of alcohol per mole of hydroxide be used.

After the alcoholate dispersion is prepared and cooled, preferably to about 20 to 30° C., the alcoholate is reacted with carbon disulphide. The carbon disulphide can be added slowly as dropwise or in a slow steady stream or the entire quantity of carbon disulphide necessary to react with the alcoholate can be added in one charge. In the first case the reaction temperature is readily controlled at a temperature of about 30° C. by the dissipation of the small quantity of heat given off by this exothermic reaction through the heat loss of the equipment. In the second case, the reaction temperature will increase slowly to a maximum of about 40 to 45° C. In neither instance is it necessary to control the reaction temperature at any specific value, and either method of adding carbon disulphide can be employed providing the alcoholate is prepared in dispersion in the manner described.

The alkali metal hydroxides which can be employed in this invention are lithium, sodium, potassium, rubidium or cesium hydroxides containing not more than one mole of water per mole of hydroxide, sodium and potassium hydroxides being the preferred reactants because of their availability. These preferred hydroxides containing no more than equimolecular proportions of water and generally containing from 0.5 to 1.0 mole of water per mole of hydroxide, are readily available as commercial products. They can be easily stored under ordinary storage conditions, and require only the usual precautionary handling by the operator as is consistent with everyday commercial practice.

It is well known that any primary, secondary or tertiary alcohol can be employed in xanthogenation, so an enumeration of the vast number of alcohols which can be utilized in the process of this invention will not be necessary for those skilled in the art. Suffice it to say that any of the usual alkyl alcohols such as methyl, ethyl, isopropyl, sec. butyl and like alcohols may all be used with substantially equivalent results.

Any inert organic sovent for the alcohol can be employed in the formation of the alcoholate dispersion but it will be readily apparent that such solvents as toluene, isopropyl ether, heptane, gasoline, among others, which are conveniently handled and are neither toxic nor too volatile to use are preferred.

The following specific examples will illustrate the process of this invention. These examples are not intended to impose any limitations on the process of this invention for the quantity of reactants employed can be varied according to the capacity of the reaction equipment and the quantity of xanthate product desired. All the specific examples employ isopropyl alcohol and sodium hydroxide in the preparation of the alcoholate and the subsequent formation of sodium isopropyl xanthate but any alcohol or any alkali metal hydroxide containing from 0.5 to 1.0 mole of water per mole of hydroxide can be substituted for these specific reactants and equivalent results can be obtained. In addition, although absolute alcohol is employed as a reactant in each of these examples, alcohols containing some water can also be employed as long as the total water present does not exceed at any time during the reactions two moles of water per mole of xanthate to be prepared. Also in the following examples the term "parts" is employed to indicate parts by weight.

Examples 1 and 2 illustrate the formation of the alcoholate dispersion by employing an excess of alcohol.

Example 1

Twenty-seven parts of sodium hydroxide containing 25% by weight of water was heated to about 80° C. until it was liquid. This liquid sodium hydroxide was then added to 150 parts of isopropyl alcohol (2.5 moles) in a reaction vessel fitted with a stirrer, condenser, and a thermometer to measure the reaction temperature. The resulting mixture was stirred and heated at 80° C. until a flocculent slurry of the alcoholate is formed in the excess isopropyl alcohol. After this dispersion was cooled to room temperature, 38 parts (0.5 mole) of carbon disulphide were added as a steady stream but at such a rate that the reaction temperature did not at any time rise above 46° C. During the addition of the carbon disulfide, the reactants were stirred. After the addition of the carbon disulphide had been completed, stirring was continued until the temperature of the resulting mixture had reached room temperature. Then sufficient water was added to about double the volume of the mixture. The diluted mixture when evaporated to dryness gave 71.6 parts, a 90% yield, of sodium isopropyl xanthate which was found to be 98% pure.

Example 2

Example 1 was repeated using the same quantities of reactants but in this preparation the sodium hydroxide containing 25% by weight of water (0.74 mole H₂O per mole of sodium hydroxide) was heated to 100° C. and added to the isopropyl alcohol to form the alcoholate. After cooling this mixture to room temperature the carbon disulphide was added dropwise and the reaction temperature was kept below 30° by external cooling. The excess isopropyl alcohol was removed by vacuum distillation. In this manner 74.5 parts, a 90% yield, of 99.5% pure sodium isopropyl xanthate were recovered.

The following examples illustrate the formation of the alcoholate in an inert solvent or diluent employing equimolecular proportions of sodium hydroxide and isopropyl alcohol.

Example 3

Sodium hydroxide containing 25% by weight of water was heated until molten. Then twenty-seven parts of this melt containing about 0.5 mole of sodium hydroxide was added dropwise with stirring to 30 parts of isopropyl alcohol dissolved in 172.5 parts of toluene. The mixture was heated to 70° C. and stirred vigorously in order to prepare a smooth gelatinous dispersion. This gelatinous dispersion is quite stable at room temperature for 24 hours. After the alcoholate dispersion had been cooled to room temperature, 8.0 parts of acetone were added to lower the viscosity of the dispersion, 38 parts of carbon disulphide were then added dropwise and the mixture was stirred to give a smooth easily controlled reaction. The temperature of the reacting materials was controlled between 25° and 30° C. with external cooling. As the reaction took place, the viscous mixture changed to a slurry which could be readily filtered. In this manner a yield of 68 parts, 88%, of sodium isopropyl xanthate found to be 97.5% pure was obtained.

Example 4

The procedure and reactants of Example 3 were employed except that 136 parts of heptane were used in lieu of toluene. In this manner a yield of 68.7 parts, 87%, of sodium isopropyl xanthate found to be 93% pure was obtained.

Example 5

Example 3 was again repeated employing the same procedure and quantity of reactants except that 140 parts of gasoline was employed in lieu of the toluene. In this manner a yield of 68.7 parts, 87%, of sodium isopropyl xanthate found to be 94% pure was obtained.

Example 6

Example 3 was repeated using the same quantity of reactants and the same procedure except that a mixed inert solvent containing 36 parts of isopropyl ether and 117 parts of heptane was used in lieu of toluene, and all the carbon disulfide was added in one charge. In this manner 66.8 parts of sodium isopropyl xanthate, 85% yield, found to be 95% pure were obtained.

Example 7

The quantity of reactants employed in Example 3 was again employed. The isopropyl alcohol was added to a mixed solvent containing 36 parts of isopropyl ether and 130 parts of toluene. Then the molten sodium hydroxide containing 25% by weight of water was reacted with the alcohol to form the alcoholate dispersion. After cooling the alcoholate dispersion to room temperature the carbon disulphide was added to the alcoholate dispersion in one charge. The reaction mixture was stirred and the temperature was kept below 30° with external cooling. In this manner a yield of 73% of the desired sodium isopropyl xanthate was obtained.

Example 8

Example 7 was repeated except that the reaction temperature was allowed to go uncontrolled and rose only to 41° C. The yield of the desired isopropyl xanthate in this reaction was 84%.

The above examples clearly illustrate that for commercial preparation of alkali metal xanthate it is not at all necessary to employ anhydrous reactants to inhibit the side reactions generally induced by the presence of water and to obtain high yields of extremely pure xanthates. The recovery of the alkali metal xanthates from the reaction medium is quite simple. When an excess of alcohol is employed, the recovery steps illustrated in Examples 1 and 2 can be employed. When the reaction is carried out with a dispersion of the alcoholate in an inert solvent, the desired alkali metal xanthate can be recovered by merely filtering the reaction medium. Thus the desired alkali metal xanthate can be obtained in highly pure form by employing any of the variations of this invention as hereinbefore described.

It is well known that alkali metal xanthates have many uses. For example, the alkali metal xanthates can be employed as an intermediate in preparing bis xanthogens useful as rubber accelerators or the alkali metal xanthates can be used in ore floatation or they can be employed as herbicides.

Although I have illustrated the process of this invention by means of specific examples, I do not desire or intend thereby to limit myself solely thereto, for as hitherto stated the precise proportions of materials used in the process can be varied and equivalent reactants may be employed if desired without departing from the spirit and scope of this invention as defined in the appended claims.

I claim:

1. An improved process for preparing alkali metal xanthates which comprises preparing a dispersion of an alkali metal alcoholate by treating an alkyl alcohol with an alkali metal hydroxide at a temperature of from about 70° C. to about 100° C. in a liquid organic medium that is inert to the alkali metal alcoholate and carbon disulfide, said medium being present in a volume of from about 16 to about 36 times that of the solid alkali metal hydroxide and containing a maximum of one mole of water for each mole of alkali metal hydroxide, cooling the reaction mixture below the boiling point of carbon disulfide, and reacting carbon disulfide with the dispersed alkali metal alcoholate, whereby substantially pure alkali metal xanthate is formed.

2. The process of claim 1 where the liquid organic medium is the same alkyl alcohol employed as reactant.

3. An improved process for preparing alkali metal xanthates which comprises preparing a dispersion of an alkali metal alkyl alcoholate at a temperature of from about 70° C. to about 100° C. by reacting substantially stoichiometric quantities of an alkali metal hydroxide and an alkyl alcohol in an inert liquid hydrocarbon, said hydrocarbon being present in a volume of from about 16 to about 36 times the volume of the solid alkali metal hydroxide and containing a maximum of one mole of water for each mole of alkali metal hydroxide, cooling the reaction mixture below the boiling point of carbon disulfide, reacting carbon disulfide with the dispersed alkali metal alcoholate in said medium whereby substantially pure alkali metal alkyl xanthate is formed and recovering said xanthate.

4. An improved process for preparing alkali metal xanthate which comprises preparing a dispersion of sodium alcoholate by treating an alkyl alcohol with sodium hydroxide at a temperature of from about 70° C. to about 100° C. in an inert liquid hydrocarbon, said hydrocarbon being present in a volume of from about 16 to about 36 times that of the solid alkali metal hydroxide and containing a maximum of one mole of water for each mole of sodium hydroxide, cooling the reaction medium below the boiling point of carbon disulfide, reacting carbon disulfide with the dispersed sodium alcoholate in said medium, whereby substantially pure sodium alkyl xanthate is formed, and recovering said xanthate.

5. An improved process for preparing sodium isopropyl xanthate which comprises preparing a dispersion of sodium isopropylate at a temperature of from about 70° C. to about 100° C. substantially stoichiometric quantities of sodium hydroxide and isopropyl alcohol in a volume of a liquid hydrocarbon equivalent to from 16 to 36 times the volume of the solid sodium hydroxide and containing a maximum of 1 mole of water for each mole of alkali metal hydroxide, adjusting the temperature of the dispersion below the boiling point of carbon disulfide, reacting carbon disulfide with the dispersed sodium isopropylate to form sodium isopropyl xanthate and recovering said xanthate.

6. An improved process for preparing sodium isopropyl xanthate which comprises preparing a gelatinous dispersion of sodium isopropylate by reacting at a temperature of from about 70° C. to about 100° C. substantially stoichiometric quantities of sodium hydroxide and isopropyl alcohol in a volume of toluene equivalent to from 16 to 36 times the volume of solid sodium hydroxide and containing a maximum of 1 mole of water for each mole of alkali metal hydroxide, adjusting the temperature of the dispersion below the boiling point of carbon disulfide, reacting carbon disulfide with the dispersed sodium isopropylate to form sodium isopropyl xanthate and recovering said xanthate.

References Cited in the file of this patent

UNITED STATES PATENTS

| Number | Name | Date |
|---|---|---|
| Re. 16,474 | Rosenstein | Nov. 16, 1926 |
| 1,852,110 | Christmann | Apr. 5, 1932 |